US006351259B2

(12) United States Patent
Breiner

(10) Patent No.: US 6,351,259 B2
(45) Date of Patent: *Feb. 26, 2002

(54) KIT FOR RECORDING OR TRANSMITTING INFORMATION OF A NOTE IN FREEHAND

(75) Inventor: Sheldon Breiner, Portola Valley, CA (US)

(73) Assignee: Wireless Note Systems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,466

(22) Filed: May 27, 1999

(51) Int. Cl.⁷ .......................... G09G 5/00; G08C 21/00
(52) U.S. Cl. ...................... 345/173; 345/179; 178/18.01
(58) Field of Search .............................. 345/82–83, 168, 345/173, 175, 176, 179, 180, 182–183; 178/18.01, 18.03

(56) References Cited

U.S. PATENT DOCUMENTS

| | | | |
|---|---|---|---|
| 3,925,610 A | | 12/1975 | French et al. ................. 178/18 |
| 4,070,649 A | | 1/1978 | Wright, Jr. et al. . 340/146.3 SY |
| 4,475,239 A | * | 10/1984 | Raamsdonk ................. 382/309 |
| 4,656,317 A | * | 4/1987 | Tsugei et al. ................. 178/18 |
| 4,672,677 A | | 6/1987 | Yamakawa ................... 382/13 |
| 4,697,048 A | | 9/1987 | Clements et al. ............. 178/18 |
| 4,817,034 A | * | 3/1989 | Hardin, Sr. et al. ............. 380/2 |
| 4,833,279 A | | 5/1989 | Chen et al. ................... 178/18 |
| 4,912,640 A | | 3/1990 | Tsugei ........................ 364/400 |
| 5,049,862 A | * | 9/1991 | Dao et al. .................... 345/179 |
| 5,063,600 A | * | 11/1991 | Norwood .................... 382/186 |
| 5,113,041 A | | 5/1992 | Blonder et al. ............... 178/18 |
| 5,120,906 A | * | 6/1992 | Protheroe et al. ............. 178/18 |
| 5,194,852 A | | 3/1993 | More et al. ................. 340/712 |
| 5,227,590 A | * | 7/1993 | Protheroe et al. ............. 178/18 |
| 5,237,651 A | | 8/1993 | Randall ....................... 395/148 |
| 5,243,149 A | | 9/1993 | Comerford et al. ........... 178/18 |

(List continued on next page.)

FOREIGN PATENT DOCUMENTS

| | | |
|---|---|---|
| EP | 0 060 688 A2 | 3/1982 |
| EP | 0665 514 A2 | 10/1989 |
| EP | 0514 194 A2 | 5/1992 |
| EP | 0655 674 A2 | 11/1994 |
| WO | WO 99/23546 | 10/1998 |

OTHER PUBLICATIONS

Merriam–Webster's Collegiate Dictionary, "Pencil" Definition, http://www.merriamwebster.com/ Nov. 2000.*
Personal Technology by Walter Mossberg, "The CrossPad Sends Paper–and–Ink Notes To Your PC Screen", The Wall Street Journal, Thursday, Apr. 9, 1998., pp. 1 page total.

*Primary Examiner*—Bipin Shalwala
*Assistant Examiner*—Jeff Piziali
(74) *Attorney, Agent, or Firm*—Blakely, Sokoloff, Taylor & Zafman

(57) ABSTRACT

The invention provides a kit for recording a note in freehand. The kit includes a plurality of notesheets and a unit for relaying information of a note in free-hand created in one of the notesheets. The unit includes a pad having a surface on which a notesheet of the plurality of notesheets can be positioned. The pad includes a housing, and secured to the housing, a positioned sensor, a signal converter, and a transmitter. The positioned sensor takes the position of a writing instrument when the notesheet is located on the surface and the writing instrument is used to create a note in freehand on the notesheet, and provides information of the note in freehand. The signal converter receives the information of the note in freehand from the position sensor and converts the information to a signal of information of the note in freehand. The transmitter receives the signal from the signal converter and transmits the signal to a remote location.

15 Claims, 16 Drawing Sheets

U.S. PATENT DOCUMENTS

| | | | |
|---|---|---|---|
| 5,322,978 A | 6/1994 | Protheroe et al. | 178/18 |
| 5,361,310 A | 11/1994 | Ishigaki | 382/13 |
| 5,369,228 A | 11/1994 | Faust | 178/18 |
| 5,380,958 A | 1/1995 | Protheroe et al. | 178/18 |
| 5,411,790 A | 5/1995 | Ogawa et al. | 428/209 |
| 5,444,192 A | 8/1995 | Shetye et al. | 178/18 |
| 5,455,901 A | 10/1995 | Friend et al. | 395/149 |
| 5,457,476 A | 10/1995 | Jenson | 345/146 |
| 5,459,796 A | 10/1995 | Boyer | 382/187 |
| 5,486,847 A | 1/1996 | Ranf et al. | 345/173 |
| 5,517,578 A | 5/1996 | Altman et al. | 382/181 |
| 5,526,023 A | 6/1996 | Sugimoto et al. | 345/173 |
| 5,561,282 A * | 10/1996 | Price et al. | 235/380 |
| 5,587,560 A | 12/1996 | Crooks et al. | 178/18 |
| 5,631,741 A * | 5/1997 | Matthews | 358/296 |
| 5,646,650 A * | 7/1997 | Miller et al. | 345/179 |
| 5,850,214 A * | 12/1998 | McsNally et al. | 345/173 |

* cited by examiner

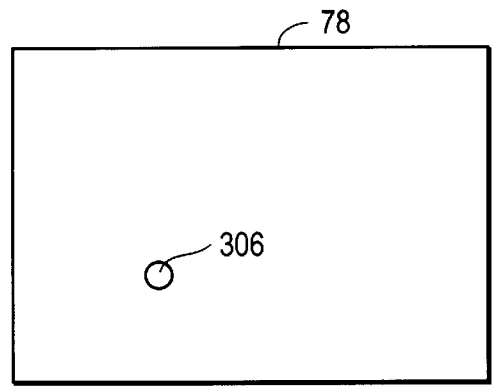
FIG. 12b
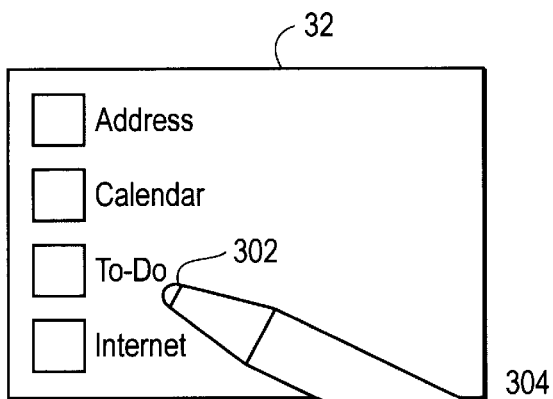
FIG. 12a
FIG. 12c
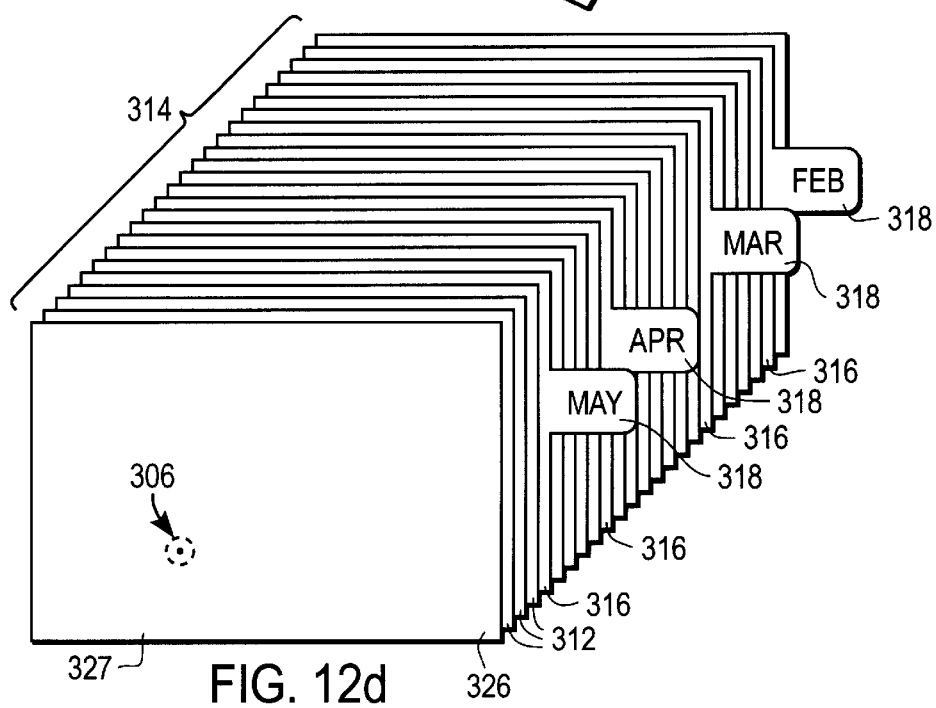
FIG. 12d

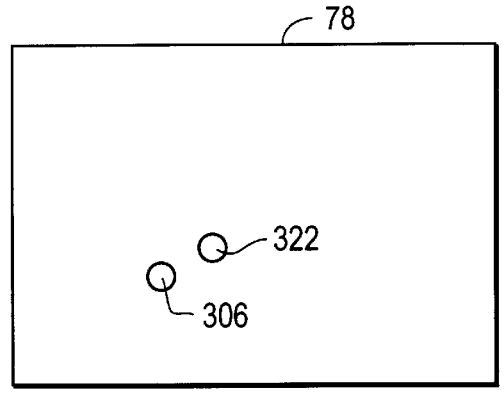
FIG. 13b
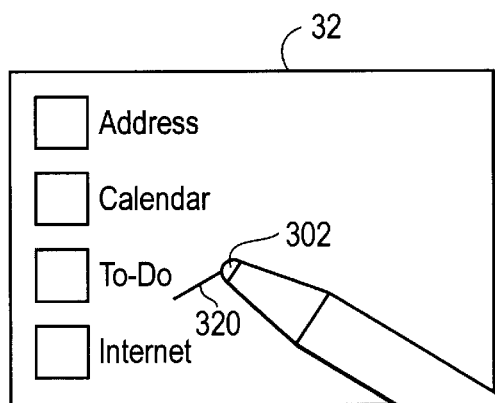
FIG. 13a
| Time | Data Point | Coordinates | Pressure |
|------|-----------|-------------|----------|
| t1   | 306       | x1;y1       | p1       |
| t2   | 322       | x2;y2       | p2       |
FIG. 13c
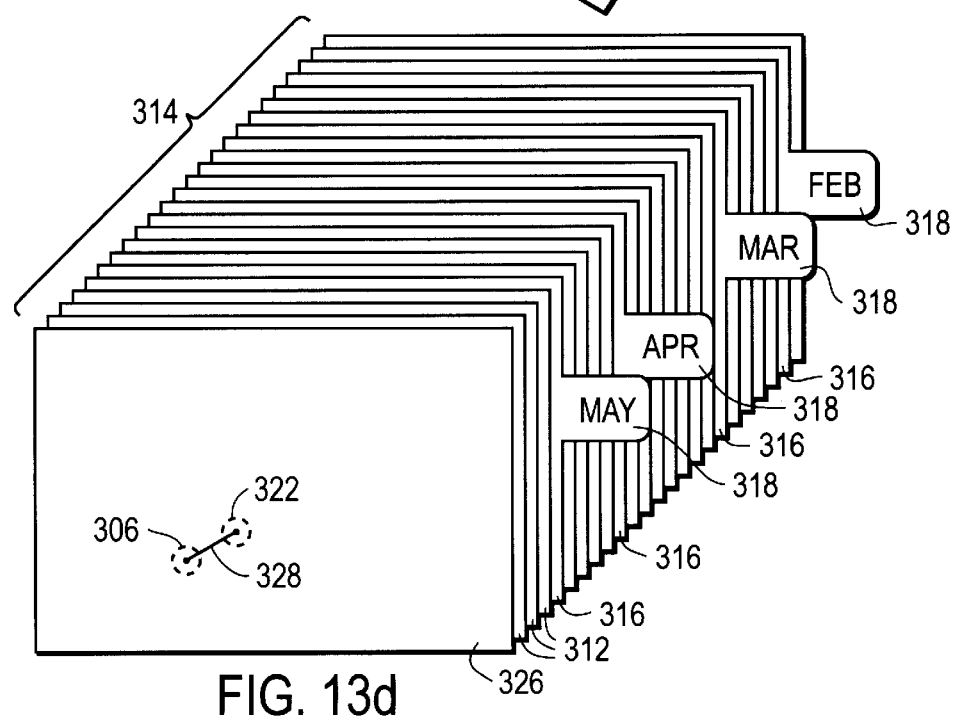
FIG. 13d

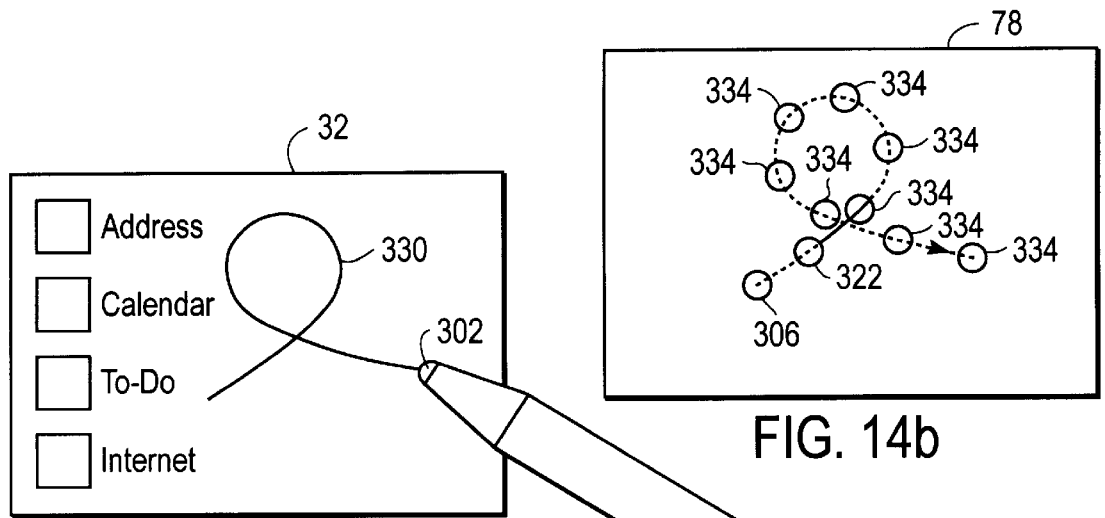
FIG. 14a
FIG. 14b
| Time | Data Point | Coordinates | Pressure |
|------|------------|-------------|----------|
| t1   | 306        | x1;y1       | p1       |
| t2   | 322        | x2;y2       | p2       |
| t3   | 334        | x3;y3       | p3       |
| ⋮    | ⋮          | ⋮           | ⋮        |
| tn   | 334        | xn;yn       | pn       |
FIG. 14c
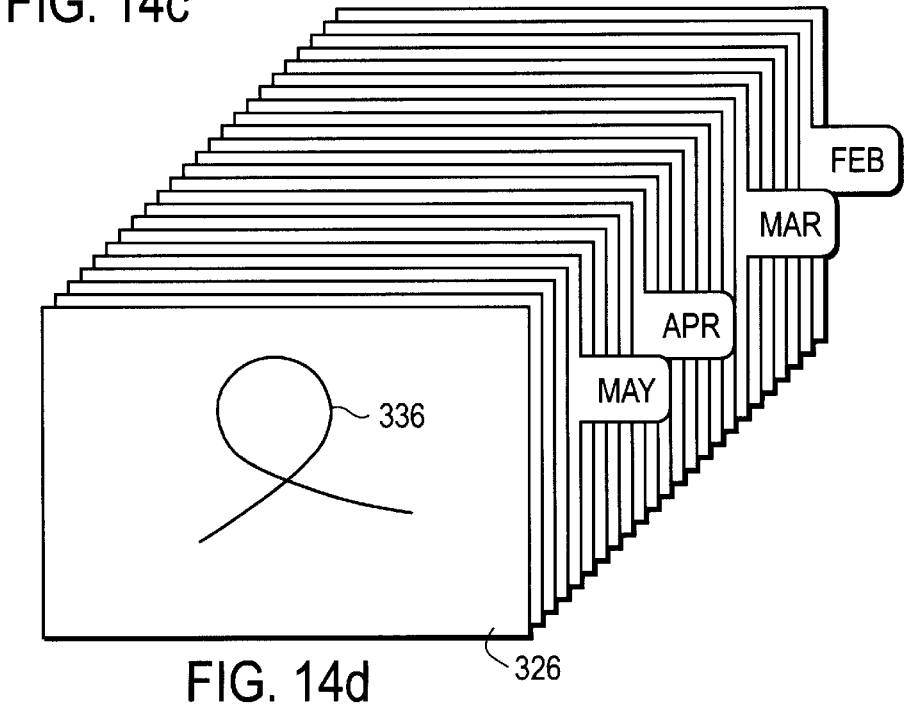
FIG. 14d

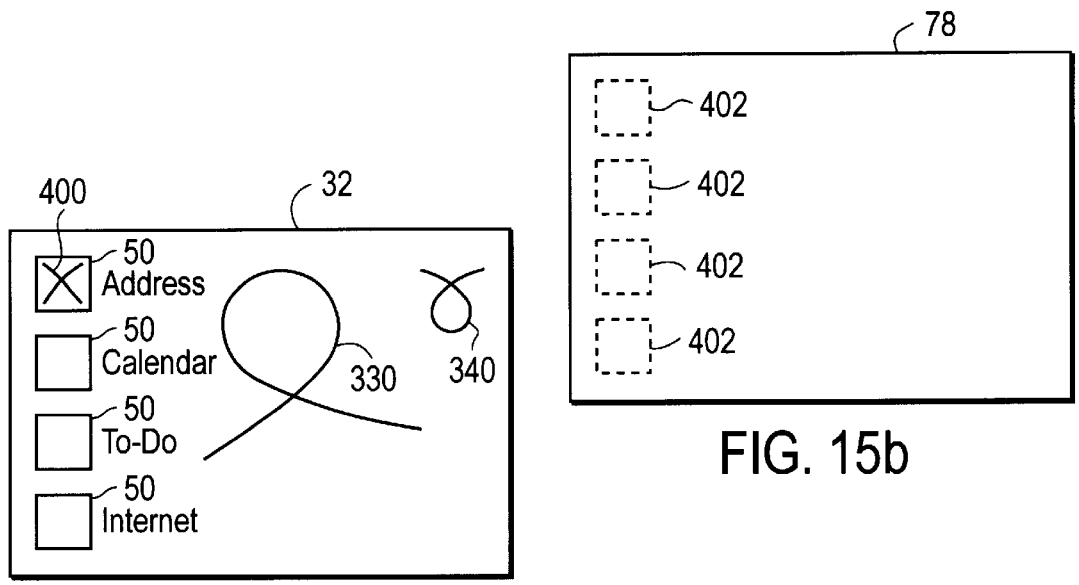
FIG. 15a
FIG. 15b
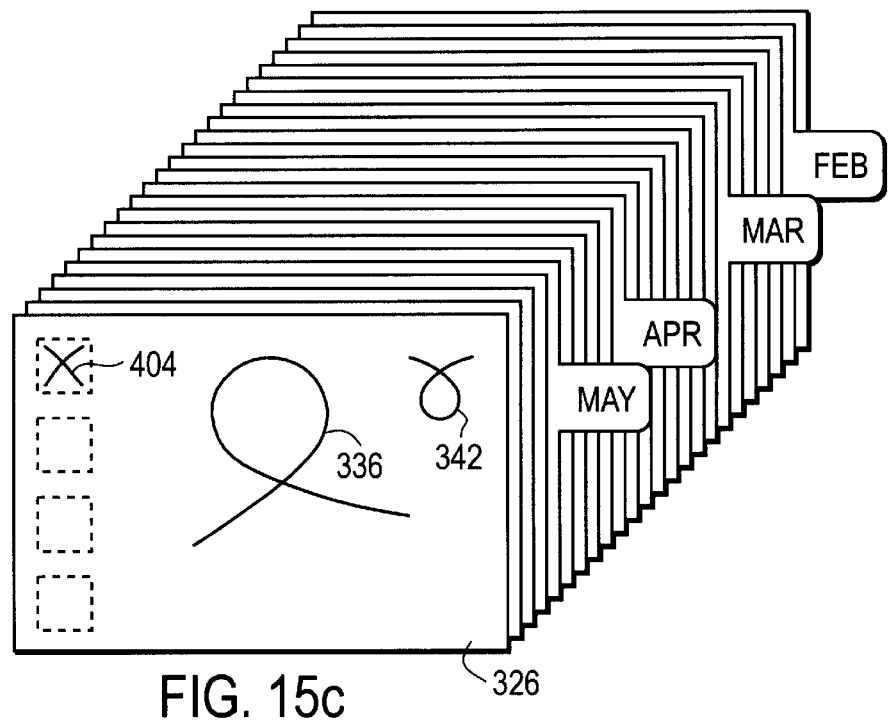
FIG. 15c

| CHARACTER | NETWORK ADDRESS |
|:---:|:---:|
| T | Network Address 1 |
| C | Network Address 2 |
| ⊗ | Network Address 3 |
| C− | Network Address 4 |
| TL | Network Address 5 |

FIG. 17

KIT FOR RECORDING OR TRANSMITTING INFORMATION OF A NOTE IN FREEHAND

BACKGROUND OF THE INVENTION

1). Field of the Invention

This invention relates to a kit for recording or transmitting information of a note in freehand.

2). Discussion of Related Art

Entering data in personal computers is accomplished in many ways including a keyboard, downloading from a network, insertion of a floppy disk or CD-ROM or a pointing device, or mouse.

Another way of entering data, usually by artists, is a graphics tablet, a flat board with a working surface on which a user draws with a special purpose pen-like stylus to create special effects on the computer screen.

When a keyboard is used to enter data into a computer, a program or application software must be present and active to receive the data, act on the data or merely accept the data. If one wants to enter simple data of the kind one normally writes on a desk pad, keyboard entry is not practical. Moreover, most persons prefer to write short notes rather than entering them into a computer via a keyboard or a special purpose stylus on the plastic surface of a graphics tablet. That is why one finds a pen and paper on practically every desk.

A popular means of writing notes is the use of a pen and sticky notes, called Post-it™ notes, which can be found on most desks at home and the office. Information on these notes is of interest to the user for a variety of home and office purposes such a telephone numbers, appointments or specific instructions to others or to oneself to take some sort of action. Most persons feel very comfortable writing something down on a piece of paper, particularly when recording a quick thought, while speaking on the telephone or to another person nearby or recording small bits of information.

In today's computer-dependent society, however, that same person will very probably wish to enter the information into his/her computer for a variety of critical purposes. Among these is to save the information for later recall; sending the information to another person in the office or in another city; verifying, or attaching, a signature; or sending a sketch or doodle.

Combining the ubiquitous sticky notes with modern electronics and the Internet would be a very useful way of solving the problems of saving and sending information, in a very friendly, practical and inexpensive manner.

SUMMARY OF THE INVENTION

The invention provides a kit for recording a note in freehand. The kit includes a plurality of notesheets and a unit for relaying information of a note in freehand created in one of the notesheets. The unit includes a pad having a surface on which a notesheet of the plurality of notesheets can be positioned. The pad includes a housing, and secured to the housing, a positioned sensor, a signal converter, and a transmitter. The position sensor detects the position of a writing tip of a writing instrument when the notesheet is located on the surface and the writing instrument is used to create a note in freehand on the notesheet, and provides information of the note in freehand. The signal converter receives the information of the note in freehand from the position sensor and converts the information to a signal of information of the note in freehand. The transmitter receives the signal from the signal converter and transmits the signal wirelessly to a remote location.

At least some of the notesheets may each include a writing sheet and ink printed on the writing sheet. The ink may be laid out so that a plurality of command areas are defined thereby.

The ink may be laid out to define a command function at each command area. Each command function may indicate a different function to be performed by a computer at a remote location.

At least one of the command functions may indicate that the computer should perform one function which may be storing an electronic representation of the note in freehand in an electronic address book, storing an electronic representation of the note in freehand in an electronic calendar, storing an electronic representation of the note in freehand in an electronic "To-Do" database, or sending an electronic representation of the note in freehand via a network to another computer.

The pad may define a selected area where the notesheet should be located and each sheet may be dimensioned substantially corresponding to dimensions of the selected area.

The housing may define a receptacle having internal dimensions which allow for holding a stack of the notesheets. The housing may define an opening through which notesheets can be removed from the stack.

Each notesheet may include a writing sheet and a sticky material on the writing sheet, the notesheet being attached to a following notesheet by the sticky material, the notesheet may be removable from the following notesheet, whereafter the sticky material is still located on the writing sheet thereof and can be used for attaching the notesheet to the surface.

The position sensor may be a graphics tablet with an upper surface of the graphics tablet defining at least part of the surface of the pad.

The signal is preferably transmitted while the note in freehand is being created.

The information may include coordinates of each of a plurality of points of the note in freehand. The information may include an amount of pressure applied at each point. The information may include the time of creation of each point.

The kit may further comprise a computer readable medium having a program stored thereon which, when installed on a computer, includes logic which communicates with a receiver which receives the transmitted signal so as to receive the information in the computer, and provides an output of the information.

The information may include coordinates of the note in freehand, the logic utilizing the coordinates to create and display a curve which substantially corresponds to at least one element of the note in freehand.

The output of the information may include a plurality of notes that are arranged chronologically.

The logic preferably detects when a line is drawn on the notesheet and creates a new note in response thereto.

The logic may measure the time taken from creation of one element to a next element of the note in freehand and, if the time is less than a predetermined value, may include the elements in a single note.

The logic may determine the position or suite of an element of the note in freehand and, depending on the position or suite, control the computer by performing a function such as storing an electronic representation of the note in freehand in an electronic address book, storing an electronic representation of the note in freehand in an electronic calendar, storing an electronic representation of the note in freehand in an electronic "To-Do" database, or sending an electronic representation of the note in freehand via a network to another computer.

The logic may send a packet over a network, the recipient of the packet depending on what the element looks like, and the packet including at least some of the information of the note in freehand.

The packet may include code which creates a note on the computer of the recipient, the note including a graphic that looks substantially the same as at least one element of the note in freehand.

The packet may include information such as what the note in freehand looks like, a time varying position of the writing instrument, a time varying amount of speed of creation of the note in freehand, or a time varying amount of pressure when creating the note in freehand. The note may also be enhanced with sound or other visual effects which may be preselected by a user creating the note in freehand.

The invention also provides a unit for relaying information of what a note in freehand created on a notesheet looks like. The unit includes a pad having a surface on which a notesheet can be located. The pad includes a housing, and, secured to the housing, a position sensor, a signal converter, and a transmitter. The position sensor detects the position of a writing tip of a writing instrument when the notesheet is located on the selected area and the writing instrument is used to create a note in freehand on the notesheet, and provides information of the note in freehand. The signal converter receives the information of the note in freehand from the position sensor and converts the information to a signal of information of what the note in freehand looks like. The transmitter receives the signal of what the note in freehand looks like from the signal converter and transmits the signal wirelessly to a remote location.

The invention also provides a unit for relaying information of what a note in freehand created on a notesheet looks like. The unit includes a pad having a surface on which a notesheet can be located. The pad includes a housing, and, secured to the housing, a position sensor, a signal converter, and a transmitter. Position sensor is capable of detecting the position of a writing tip of a pencil when the notesheet is located on the selected area and the pencil is used to create a note in freehand on the notesheet, and provides information of the note in freehand. The signal converter receives the information of the note in freehand from the position sensor and converts the information to a signal of information of what the note in freehand looks like. The transmitter receives the signal of what the note in freehand looks like from the signal converter and transmits the signal to a remote location.

BRIEF DESCRIPTION OF THE DRAWINGS

The invention is further described by way of example with reference to the accompanying drawings wherein:

FIG. 12a is a plan view of one of the notesheets when a tip of a writing instrument is just used to contact the notesheet;

FIG. 12b is a plan view of a graphics tablet of the desk unit on which the notesheet is located, illustrating where the graphics tablet detects the location and pressure of the writing tip of the writing instrument;

FIG. 12c is a table illustrating information received by the computer when the writing tip is as shown in FIG. 12a;

FIG. 12d illustrates a graphic display on a video display of the computer when the writing tip of the writing instrument is positioned as in FIG. 12a;

FIG. 13a is a plan view of the notesheet after the user has just started a note in freehand;

FIG. 13b is a plan view of the graphics tablet, illustrating how the graphics tablet sequentially detects distinct locations of the writing tip of the writing instrument;

FIG. 13c is a table like the table in FIG. 12c which is updated with information when the writing tip is as shown in FIG. 13a;

FIG. 13d is a view similar to FIG. 13c when the user starts creating a note in freehand like the note in freehand created on the notesheet as shown in FIG. 13a;

FIG. 14a is a plan view of the notesheet after the user has created one element of the note in freehand thereon;

FIG. 14b is a plan view of the graphics tablet illustrating how the graphics tablet has sequentially detected respective positions of the writing tip of the writing instrument;

FIG. 14c is a table like the table of FIG. 13c which is updated with information of a freehand element created as shown in FIG. 14a;

FIG. 14d illustrates how the note in freehand is represented on the new note on the video display unit;

FIG. 15a is a plan view of the notesheet after the user has added another element of the note in freehand and a command element within a printed command area;

FIG. 15b is a plan view of the graphics tablet illustrating respective areas of the graphics tablet, each located directly below each one of a number of command areas of the notesheet;

FIG. 15c illustrates the display on the video display unit when the note in freehand is finally created as shown in FIG. 15a;

FIG. 16 illustrates an address book database which is updated so as to include an additional entry which is a copy of the new note created as shown in FIG. 15c after the user has created a command element within one of the command areas on the notesheet as illustrated in FIG. 15a;

FIG. 17 illustrates a command element address book located in the computer;

DETAILED DESCRIPTION OF THE INVENTION

Figure 1:
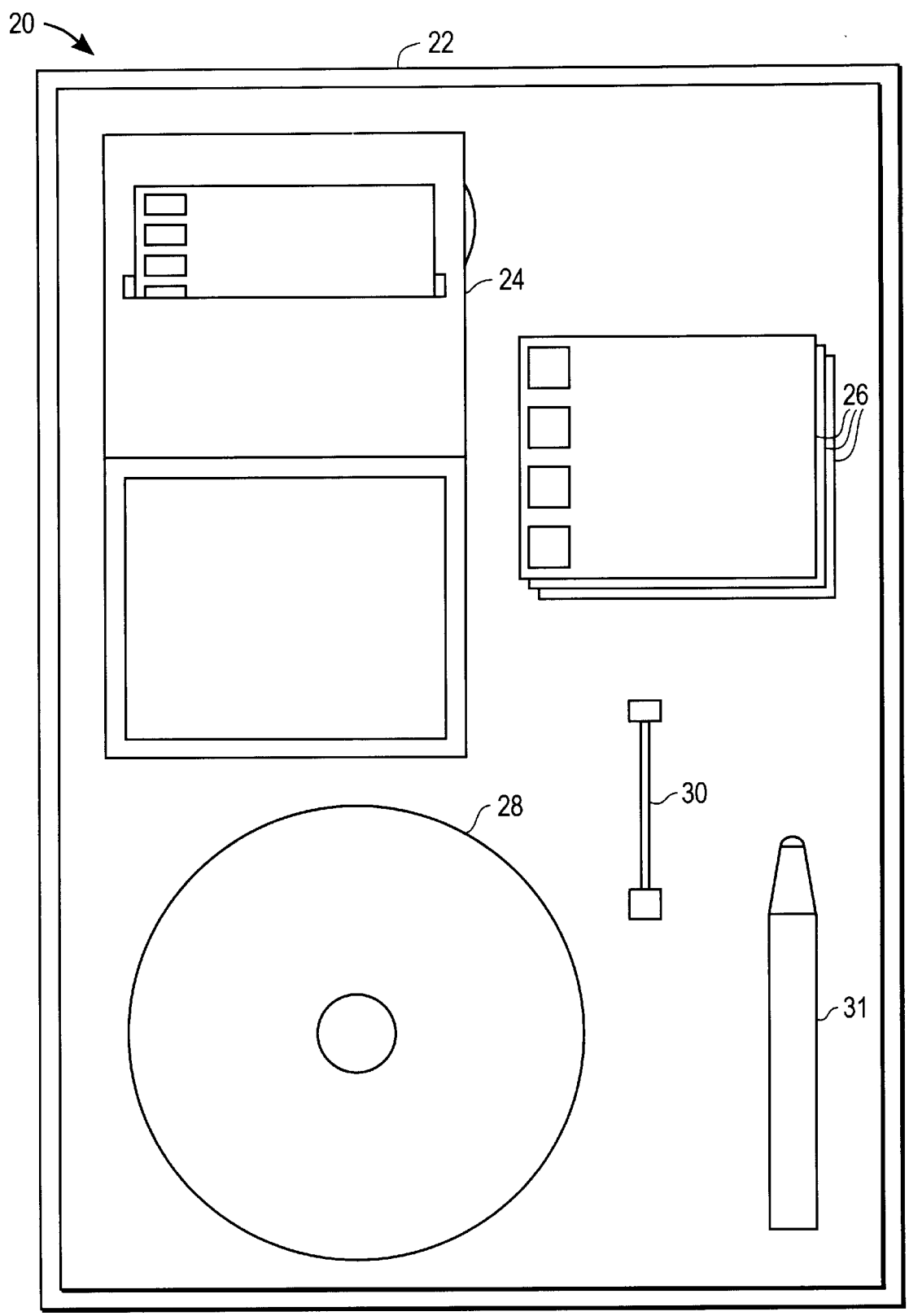
FIG. 1 is a plan view of a kit, for recording a note in freehand, according to an embodiment of the invention.

FIG. 1 of the accompanying drawings illustrates a kit 20 for recording a note in freehand. The kit 20 includes a container 22 and a desk unit 24, stacks of notesheets 26, a computer readable medium in the form of a CD-ROM 28, a receiver/connector assembly 30, and a writing instrument 31 such as a pen or a pencil located within the container 22.

Figure 2:
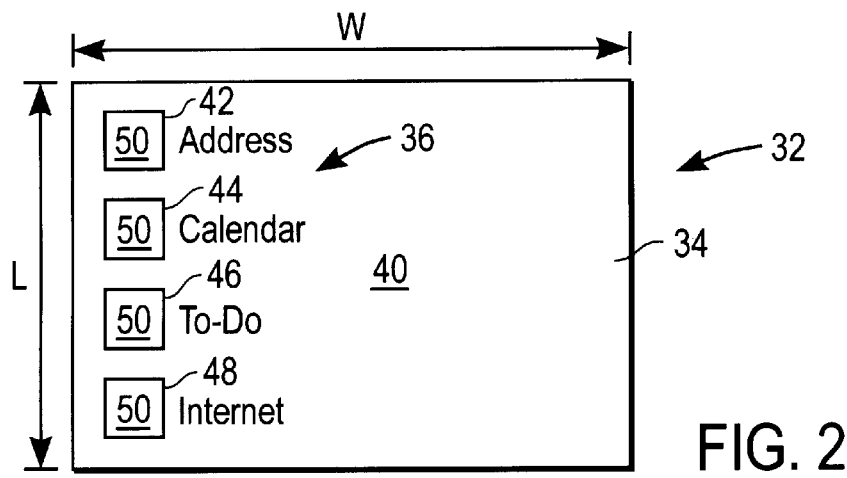
FIG. 2 is a plan view of a notesheet forming part of the kit.
Figure 3:
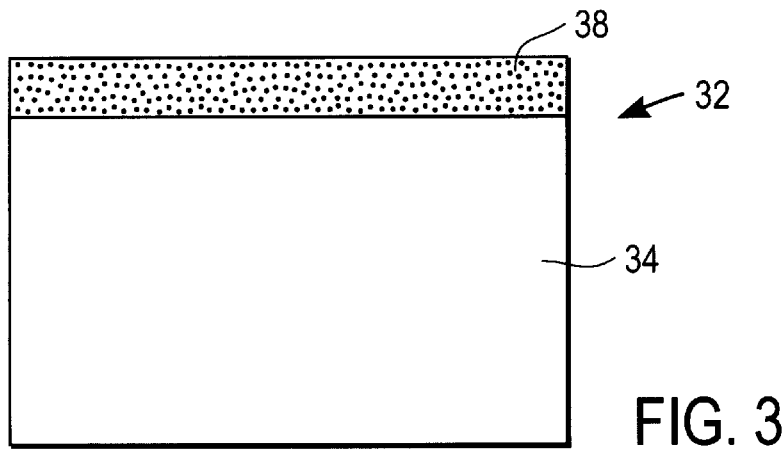
FIG. 3 is a bottom view of the notesheet.

FIG. 2 and FIG. 3 illustrate one notesheet 32 of one of the stacks 26. The notesheet 32 includes a paper writing sheet 34, ink 36 printed on a front of the writing sheet 36, and a sticky material 38 on a back of a writing sheet 34. The writing sheet has a width W and a length L. The ink 36 is located on an edge of the writing sheet 34, thus leaving enough open space 40 for creating a note in freehand of the writing sheet 34.

The ink 36 is laid out in the form of a first, second, third and fourth block 42, 44,46 and 48 respectively. A respective command area 50 is thus defined within each block 42, 44, 46, and 48. The word "Address" is printed next to the first block 42, the word "Calendar" is printed next to the second block 44, the words "To-Do" are printed next to the third block 46, and the word "Internet" is printed next to the fourth block 48. The words printed next to the blocks 42 to 48 are command functions, each indicating a different function to be performed by a user's computer at a remote location as will be described in more detail hereinbelow.

Figure 4:
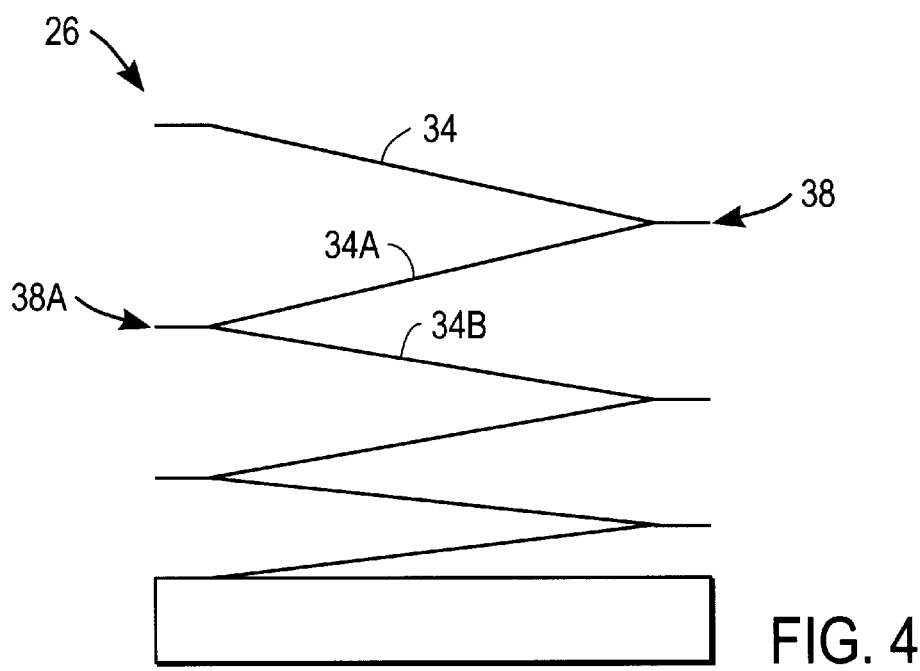
FIG. 4 is a side view of a stack of the notesheets of FIG. 2 and FIG. 3.

The sticky material 38 is located in a strip on an edge on one side only of the back of the writing sheet 34. As shown in FIG. 4 the writing sheet 34 can be attached to a following writing sheet 34A by the sticky material 38. The writing sheet 34A has sticky material 38A only on a side thereof opposing a side to which the writing sheet 34 is attached thereto. The sticky material 38A is used to attach the writing sheet 34A to a next writing sheet 34B which is similar to writing sheet 34. By attaching the writing sheets 34, 34A, 34B etc. in such a manner the stack 26 is thus in the form of a fan or a concertina.

Figure 5:
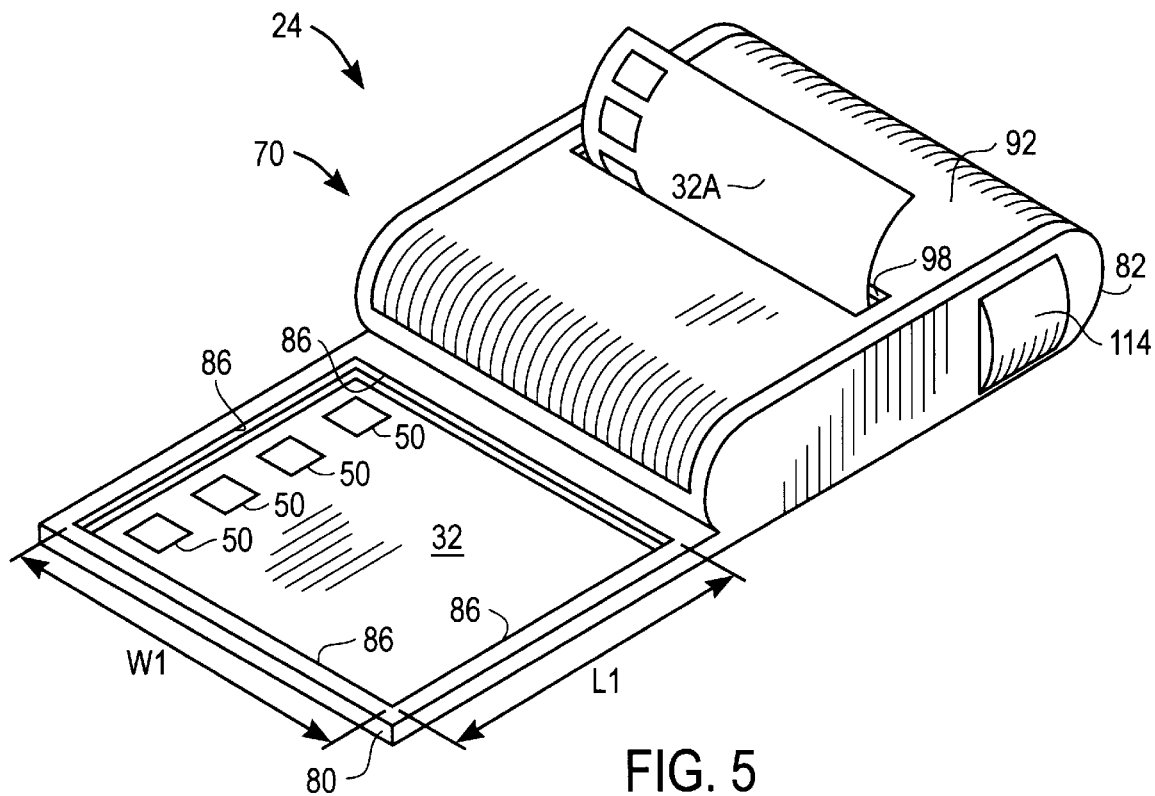
FIG. 5 is a perspective view of a desk unit forming part of the kit.
Figure 6:
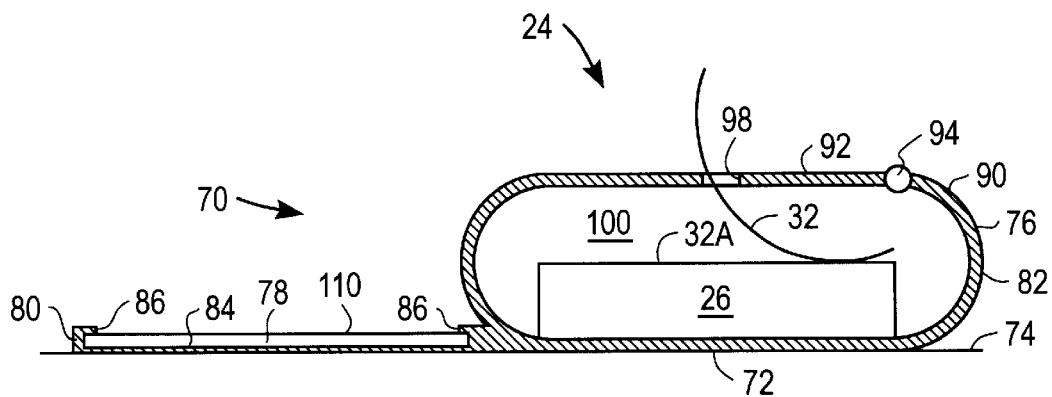
FIG. 6 is a sectioned side view of the desk unit.

FIG. 5 and FIG. 6 illustrate the desk unit 24 in more detail. The desk unit 24 is in the form of a desk pad 70 having a lower surface 72 which can be positioned on a desk 74. The desk pad 70 includes a housing 76 and a graphics tablet 78.

The housing 76 includes a front portion 80 and a rear portion 82.

The front portion 80 has a recess 84 having a periphery 86. The graphics tablet 78 is mounted within the recess 84 so that the periphery 86 forms an aperture through which the graphics tablet 78 is visible from above. Lines are printed or otherwise defined on the graphics table to indicate a selected area that has a width W1 and a length L1.

The rear portion 82 includes a partial enclosure 90 and a lid 92 which is pivotally secured to the partial enclosure 90 by a hinge 94. An opening 98 is formed through the lid 92.

In use, the lid 92 is opened so that one of the stacks 26 can be inserted into the partial enclosure 90. An upper one of the notesheets 32 is then partially inserted through the opening 98. The lid 92 is then closed so that the partial enclosure 90 and the lid 92 jointly define a receptacle 100 for the stack 26. The receptacle 100 has internal dimensions which are slightly larger than the stack 26 to allow for housing of the stack 26. The opening 98 is relatively narrow in one dimension when compared to the length one of the notesheets 32, and is at least as wide as one of the notesheets 32 in a cross dimension.

The notesheet 32 may be pulled out of the receptacle 100. The following notesheet 32A then follows the notesheet 32 out of the receptacle 100. The notesheet 32 is then detached from the notesheet 32A which, in turn, has a portion located externally of the receptacle 100. A weight (not shown) may be attached to the receptacle to prevent lifting of the housing 76 when the notesheets 32 and 32A are pulled out. The sticky material of the notesheet 32 remains thereon and can be used again for attaching the notesheet 32 to another surface.

The graphics tablet 78 has an upper surface 110 on which the notesheet 32 can be positioned and attached thereto. The width W1 of the selected area defined by the lines is only slightly wider than the width W of the notesheet 32, and the length L1 of the selected area is only slightly longer than the length L of the notesheet 32. The selected area also defines an orientation of how the notesheet 32 is to be located, i.e. within relatively tight tolerances. Provided that the command areas 50 are always printed at substantially the same locations on the writing sheet 34 of the notesheet 32, 32A etc. and because the notesheet 32 is located within relatively tight tolerances on the graphics tablet 78, the command areas 50 are always located over the same areas of the graphics tablet 78.

The graphics tablet 78 has an array or a matrix which senses where and when pressure is applied thereto. The graphics tablet 78 also detects how much pressure is applied thereto. When a writing instrument is thus used to create a note in freehand on the notesheet 32, pressure is applied to an area of the graphics tablet 78 directly below a writing tip of the writing instrument. Graphics tablets are known in the art. The graphics tablet may, for example, be a thread of overlying wires. When pressure is applied to the wires, the capacitancies of the wires will change. An output can be provided by the graphics tablet which, at each moment in time, provides information of where, and the magnitude of pressure which is applied thereto. Alternatively, the graphics tablet 78 may be a stack of resistive sheets separated by a perforated insulator such that, when the stack is compressed by the writing instrument, the sheets act as an orthogonal resistor bridge. Other graphics tablets may also be used.

Figure 7:
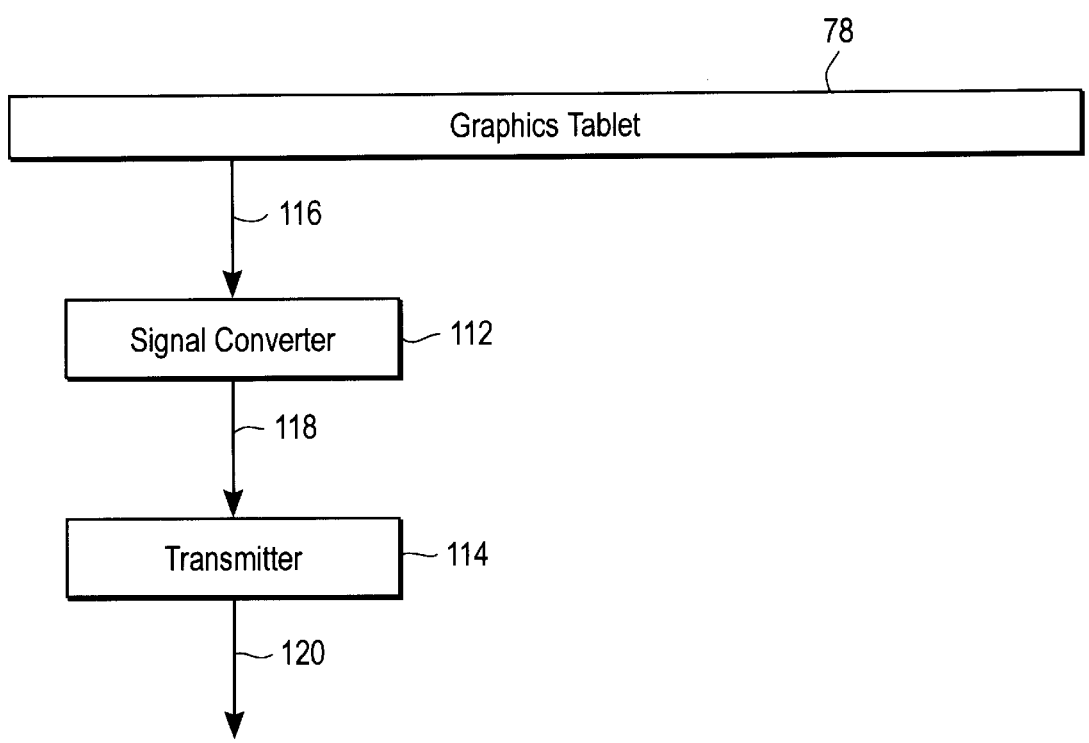
FIG. 7 is a block diagram of components forming part of the desk unit.

FIG. 7 is a block diagram of the desk unit 24 including the graphics tablet 78. In addition to the graphics tablet 78, a signal converter 112 and a transmitter 114 are also mounted to the housing 76. The graphics tablet 78 provides an analog output 116 of where pressure and how much is applied thereto at each moment in time. The signal converter 112 receives the analog output 116 (and therefore also information of the note in freehand) from the graphics tablet 78. The signal converter converts the analog signal 116 to a digital signal 118. The digital signal 118 includes information of where pressure is applied to the graphics tablet 78 at that moment, and, over time, therefore also what the note in freehand created on the notesheet 32 looks like as well as the pressure applied at each point of the note in freehand.

A transmitter 114 receives the digital signal 118 from the signal converter 112 and transmits a wireless signal 120 to a remote location. The transmitter 114 is typically an infrared or radio frequency transmitter and the wireless signal 120 is typically an infrared or radio frequency signal. An advantage of a radio frequency signal is that no line of sight is required between the transmitter 114 and a receiver. Infrared transmitters are however less expensive than radio frequency transmitters and usually allow for more bandwidth. The wireless signal 120 includes information of where pressure is applied to the graphics tablet 78 at that moment and, over time, information of what the note in freehand created on the notesheet 32 looks like, and how much pressure and the moment in time of each point of the note in freehand.

Figure 8:
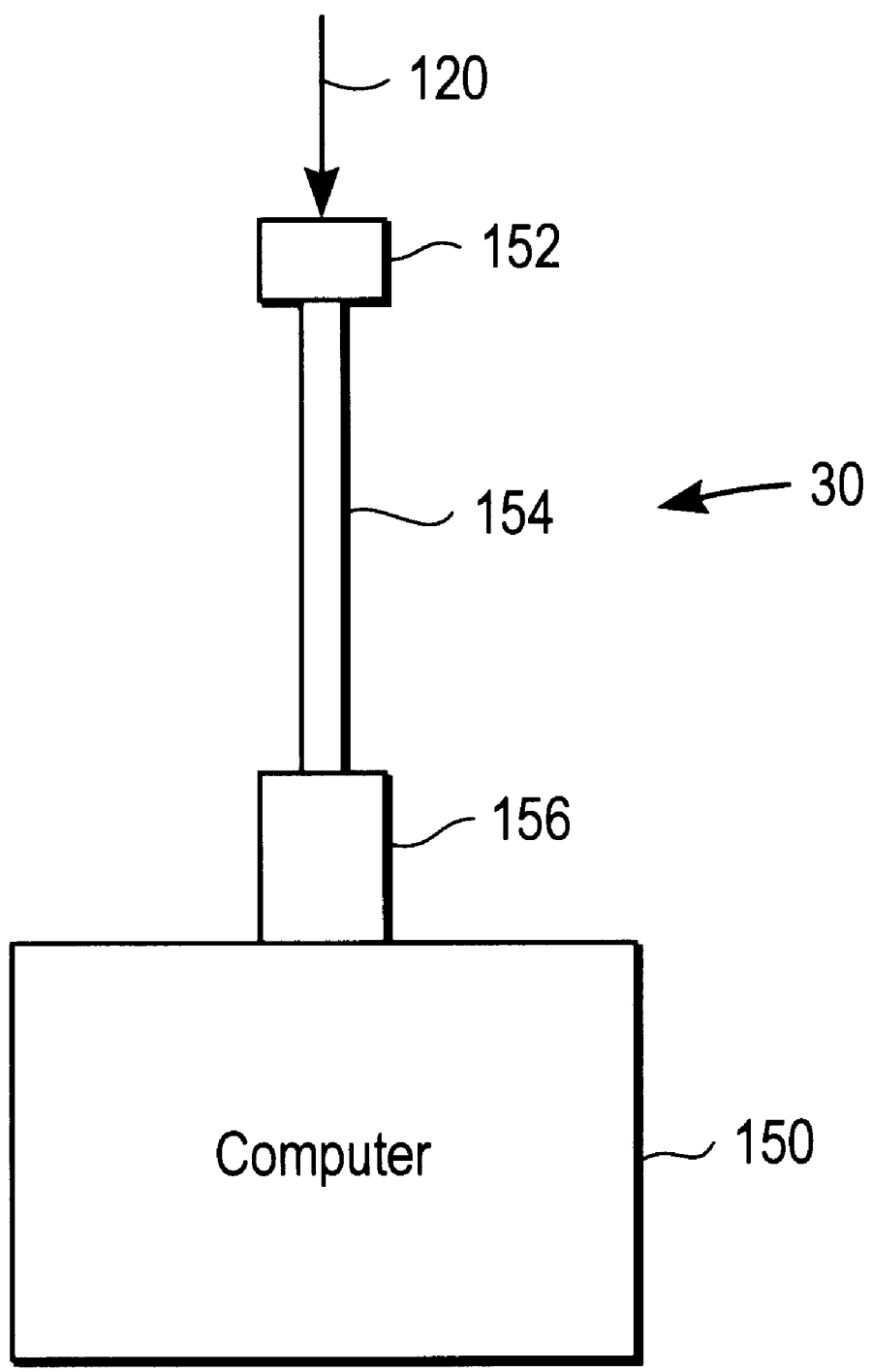
FIG. 8 is a block diagram of a receiver/connector assembly for receiving information from the desk unit, and a computer to which the receiver/connector assembly is connected.

FIG. 8 illustrates the receiver/connector assembly 30 which is used in combination with a computer 150. The receiver/connector assembly 30 includes a receiver 152, an extension 154, and a connector 156. One end of the extension 154 is connected to the receiver, and an opposing end of the extension 154 is connected to the connector 156. The connector 156 may be a serial port connector, a parallel port connector, a universal serial bus (USB) connector, a firewire or any other connector which can be used for interfacing with the computer 150. A receiver may, alternatively, be built into a computer. The receiver 152 is typically an infrared receiver which can receive the infrared signal 120 transmitted by the transmitter 114. The receiver 152 then provides the signal to the computer 150 via the extension 154 and to a connector 156. The computer 150 thus receives information of where and how much pressure is applied to the graphics tablet 78 at that moment, and, over time, information of what the note in freehand created on the notesheet 32 looks like and how it is created in terms of time and pressure applied.

Figure 9:
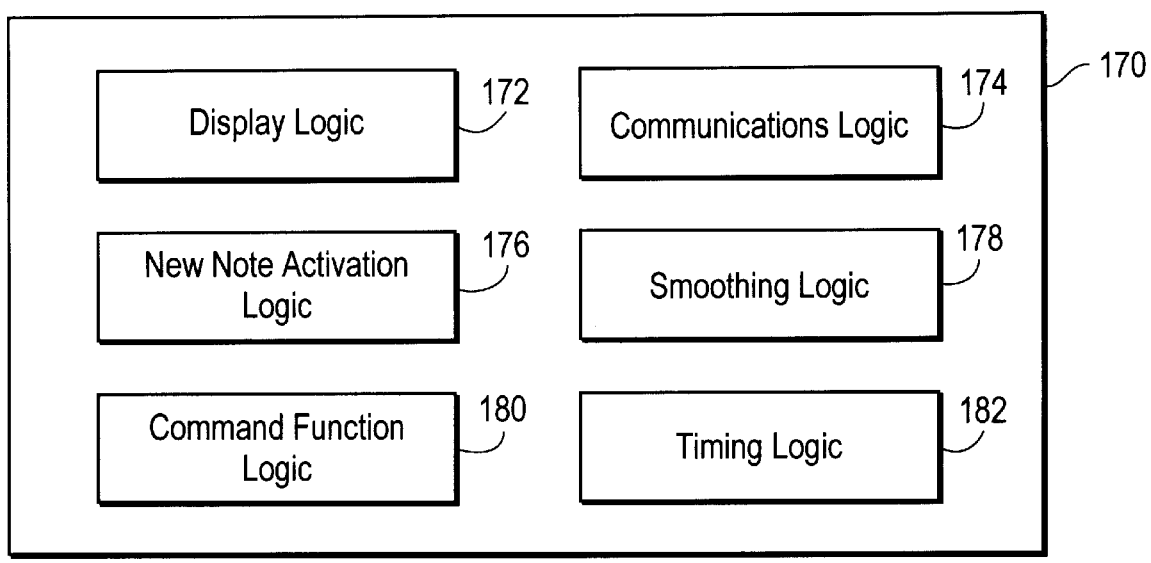
FIG. 9 is a visual representation of a program which is stored on a CD-ROM or other computer readable medium forming part of the kit.

FIG. 9 illustrates a program 170 which is stored on the CD-ROM 28. The program 170 includes display logic 172, communication logic 174, new note activation logic 176, smoothing logic 178, command function logic 180, and timing logic 182. The program 170 is loaded into the computer 150.

Figure 10:
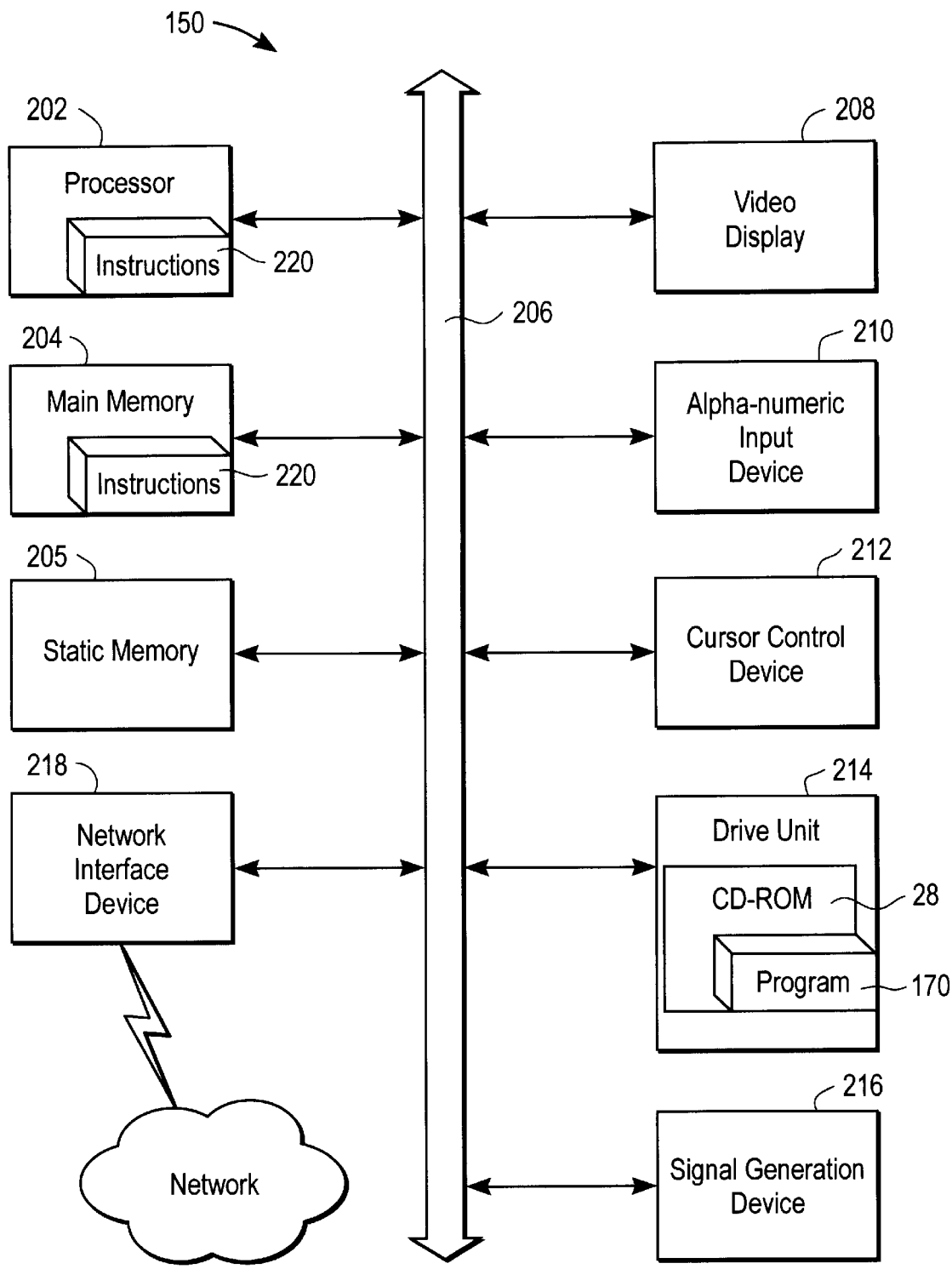
FIG. 10 is a block diagram of the computer of FIG. 8.

FIG. 10 illustrates the computer 150 in more detail. The computer 150 includes a processor 202, a main memory 204 and a static memory 205 which communicate with each other by a bus 206. The computer 150 is further shown to include a video display unit 208 e.g. a liquid crystal display (LCD). The computer 150 also includes an alpha-numeric input device 210 (e.g. a keyboard), a cursor control device 212 (e.g. a mouse), a disk drive unit 214, a signal generation device 216 (e.g. a speaker), and a network interface device 218. The CD-ROM 28 including the program 170 is inserted into the disk drive unit 214 and installed on a hard drive of the computer 150. Some instructions of the program are loaded into the computer. Once the program 170 is loaded into the computer, software 220 resides, completely or at least partially, within the main memory and/or within the processor 202. Some of the software also remains on the hard drive.

The desk unit 24 is usually located on a desk of a user. The computer 150 may be located in the general vincinity, but remotely from the desk unit. The desk unit is then used for relaying information of what a note in freehand created on one of the notesheets 32 looks like. The computer 150 receives the information, provides a display of the information, and also stores the information at different locations.

Figure 11:
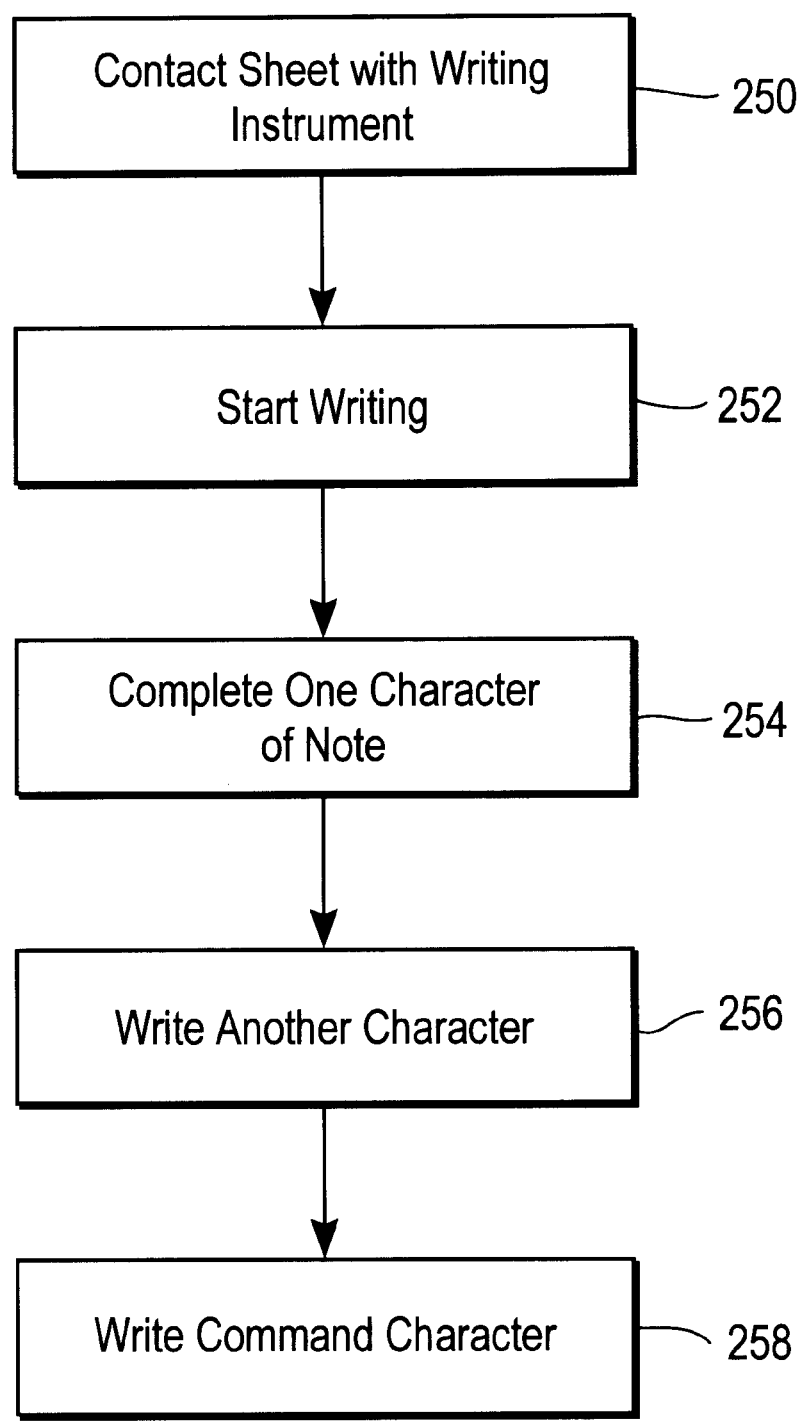
FIG. 11 is a flow chart illustrating the respective steps which a user goes through while creating a note in freehand on one of the notesheets.

FIG. 11 illustrates how a user records a note in freehand utilizing the kit 20 hereinbefore described. In step 250 the user contacts the notesheet located on the graphics tablet with a writing tip of a writing instrument such as a pen or a pencil. In step 252 the user starts writing on the notesheet. In step 254 the user completes one element of a note in freehand on the notesheet. In step 256 the user optionally writes another element on the notesheet. In step 258 the user optionally writes a command element on one of the command areas of the notesheet. Steps 250 to 258 are now illustrated with reference to FIG. 12, FIG. 13, FIG. 14, and FIG. 15.

FIG. 12a illustrates the notesheet 32 which is located on the graphics tablet 78. A user contacts the notesheet 32 with a writing tip 302 of a writing instrument 304 such as a pen or a pencil. (Step 250). The writing instrument 304 may be the writing instrument 31 included in the kit 20, or may be any other writing instrument that is readily available. FIG. 12b illustrates that the graphics tablet 78 has a location 306 directly below the writing tip 302 where the graphics tablet 78 senses that pressure is applied thereto at the location 306. The graphics tablet 78 sends a signal to the computer 150 of coordinates of the location 306 and how much pressure is applied thereto at the location 306. FIG. 12c illustrates information received by the computer 156 due to the writing tip contacting the notesheet 32 as shown in FIG. 12a. The computer 150 receives the information of the location 306 at a moment in time (t1) which is when the writing tip 302 contacts the notesheet 32. The information received by the computer of the location 306 includes the coordinates (x1; y1) of the location and the amount of pressure (p1) applied at the location 306. FIG. 12d illustrates a visual display on the video display 208. The display logic 172 displays a number of notes 312 in a stack 314. The notes 312 are located visually behind one another and are organized chronologically by time of creation. Month and year separators 316 are located between the notes 312. Each month separator 316 has a respective tab 318 which indicates the month of the notes that follow. Utilizing the cursor control device 212, a user may click on one of the tabs 318 to access the notes 316 of that month, and then click through the notes to find the note that the user is looking for. Alternatively, a user may also use other means, such as categories, to organize the notes. The category of each note may be entered utilizing block letters written on the notesheet, a keyboard or other device. The user may access a required note by searching utilizing time, block letters, or keystrokes.

The computer receives the information about the coordinates of the location 306, and adds an additional note 326 to the last note 312 of the stack 314 by first drawing a rectangular boarder 327 and then filling the border 327 with color such as yellow. A dot is added to the note 326 at the coordinates corresponding to the location 306. The computer 150 may provide an audible notification via the signal generation device 216, such as "beep" sound, when receiving the information relating to the location 306.

FIG. 13a illustrates the user starting to create a note in freehand on the notesheet 32. (Step 252). The writing tip 302 moves over the notesheet 32 to create a line 320. FIG. 13b illustrates the graphics tablet 78 again being depressed at a location 322 which is displaced from the location 306. For purposes of illustration only the locations 322 and 306 are shown, but it should be understood that the graphics tablet 78 may have detected locations between the locations 306 and 322 while the user created the line 320. Coordinates of the location 322 are again provided to the computer 150. FIG. 13c illustrates that the computer 150 now receives information of the location 322. The information of the location 322 include the moment in time (t2) when the writing tip 302 moves over the location, the coordinates (x2, y2) of the location 322, and the pressure (p2) applied at the location 322. A line 328 is also added to the note 326 from the coordinates of the location 306 to the coordinates of the location 322, as shown in FIG. 13d.

FIG. 14a illustrates the user completing one freehand element 330 of a note in freehand on the notesheet 32. (Step 254). As shown in FIG. 14b, the graphics tablet 78 detects the position of the writing tip 302 sequentially at a number of additional locations 334. The coordinates of each location 334 are also forwarded to the computer 150 when detected. FIG. 14c illustrates the information received by the computer. For each one of the locations 334 the computer receives information regarding the moment in time (t3 . . . tn) when pressure is applied to the respective location 334, the coordinates (x3; y3 . . . xn; yn) of the respective location 334, and the pressure (p3 . . . pn) applied at the respective location 334. The smoothing logic 178 fits a smoothing curve 336 through the coordinates of the locations 334 as shown in FIG. 14d. Smoothing curves are known in the art. The smoothing curve 336 looks the same or at least substantially the same as the element 330 on the notesheet 32. It can thus be seen that electronic versions of notes can be created with an ordinary pen or pencil.

A person may then create another freehand element 340 on the notesheet 32 as illustrated in FIG. 15a. (Step 256). The user may then utilize a user predesignated penstroke, recognized by the computer, which indicates that the note 326 is complete. A new note will then be created when the user again depresses on the graphics tablet 78. Alternatively, the timing logic 182 determines the amount of time from when the element 330 is finally completed until when the creation of the element 340 is started. Depending on the amount of time between the elements 330 and 340, the timing logic determines whether a new note should be created or not. If the amount of time is less than, for example, five minutes the timing logic determines that element 340 is part of the same note as the element 330 and adds a curve 342 on the note 326. A new note will only be created if the amount of time is more than five minutes. Alternatively a user may create a penstroke to indicate that a new note should be created. The note 326 may then have a curved border, blink, or otherwise indicate that some action should be taken such as saving the note 326 in another database or viewing the note 326 for correctness. The user may then access the note 326, change it, or save it in any desired location. It may also be possible for the user to carry out any operations on the note 326 as on the notesheet 32, which correspondingly similar reaction by the computer.

As also illustrated in FIG. 15a, the user may, additionally, write a command element 400 in one of the command areas 50. (Step 258). Because the notesheet 32 is accurately located in a selected area over the graphics tablet 78, the command element 400 will always be detected in one of four areas 402 of the graphics tablet 78. A ridge (not shown) may be located on the graphics tablet 78 to prevent or hinder a user from writing on the command areas while creating the element 340 or 330. The graphics tablet 78 provides information of the coordinates of the command element 400 to the computer 150. The computer 150 may display the command element as a element 404 on the notesheet 326. In addition, the note 326 may include fields which correspond in appearance to the areas 50 and other ink printed on the notesheet 32. More importantly is that the command function logic 180 recognizes that the command element 400 is detected within one of the areas 402, which area 402 detects the command element 400, and sometimes also what the command element 400 looks like. The use of a command element such as the command element 400 is now described in more detail. It should be noted, that, although the command elements are created on the notesheet as hereinafter described, the logic in the computer may also allow for manipulating of the computer by creating command elements on the note itself with reaction of the computer in an identical manner as hereinafter described.

Figure 16:
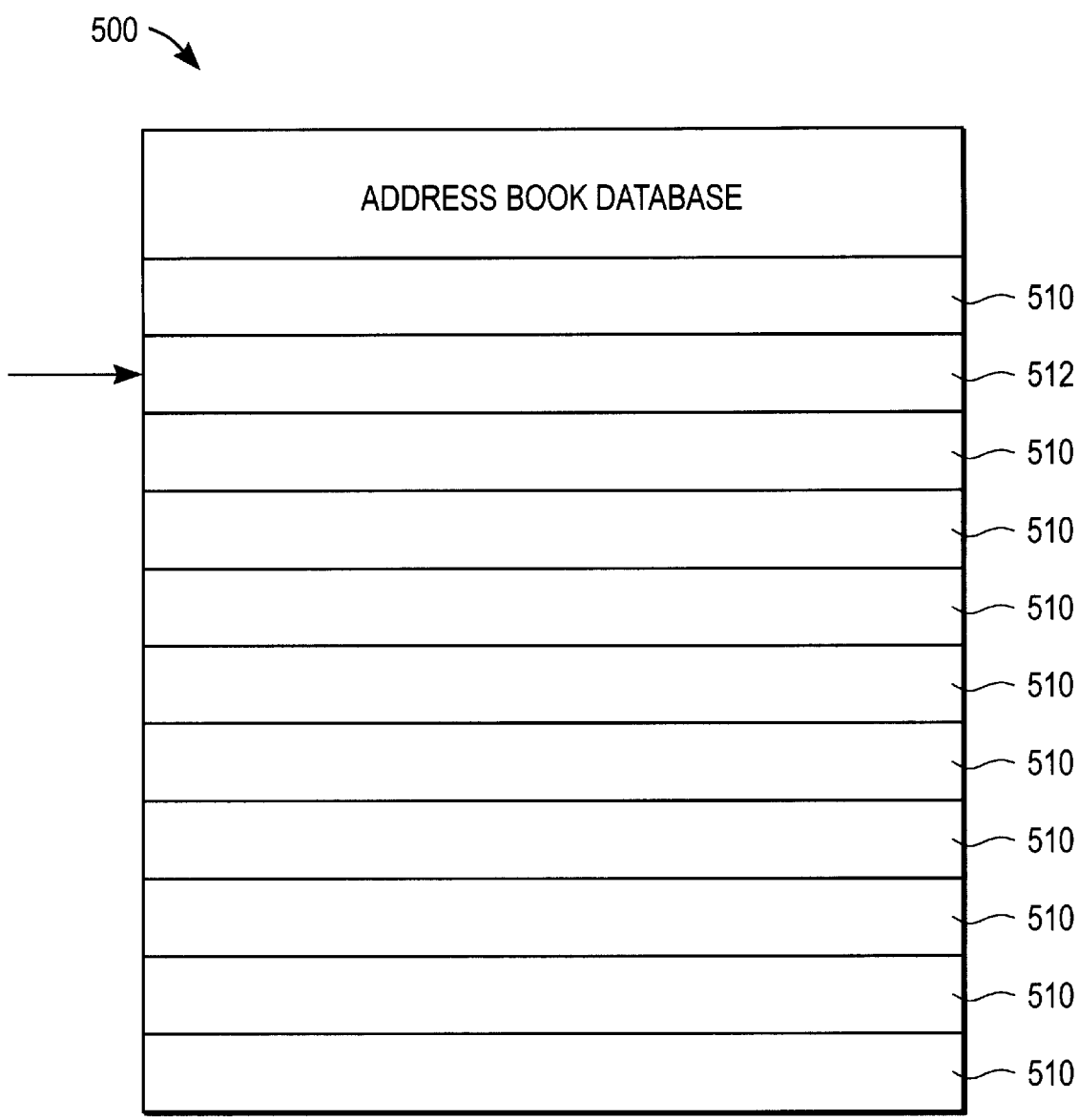

FIG. 16 of the accompanying drawings illustrates an address book database 500 within the computer 150. The address book database 500 includes a number of address book entries 510. Address book databases are known in the art and can be created and accessed with known computer applications.

As shown in FIG. 15a, the user creates the command element 400 in the command area 50 with "Address" next to it. The graphics tablet 78 detects where the command element 400 is created, namely directly above one of the areas 402, and transmits the coordinates of the command element 400 to the computer 150. The command function 180 determines that the coordinates of the command element 400 respond to the command area 50 with "Address" next to it. Then, upon determination of the coordinates of the command element 400, the command function logic 180 creates a copy of the newly created note 326 and stores the copy as a new address book entry 512 in the address book database 500. The computer 150 may automatically convert the entry 512 to text, or a user may subsequently manually convert the entry 512 to text utilizing the alpha-numeric input device 210. It can thus be seen that entry of records into a database such as the address book database 500 can be done without the complications of calling special commands on a computer or following complex protocol or wait for an application to be activated. An electronic version of a hard copy is thus be created and stored and can be easily and automatically processed. The entry 512 may be stored in a buffer database for later access. Alternatively a user may type on the note 326 to designate a filing location, or separately type block letters to designate a filing location.

The address book database 500 may be viewed, utilizing a suitable application, on the video display unit 208 of the computer 150. A user will then see that there is a new address book entry 512. The user may then access the new address book entry 512 in the address book database 500. When the new address book entry 512 is opened, a note appears which is the same as the note 326 in FIG. 15c.

Similarly, a calendar database and a "To-Do" database may also be located in the computer 150. When a user creates an element on one of the areas 50 with "Calendar" or "To-Do" next to it, a copy of the note 326 will be stored in either the calendar database or the "To-Do" database. Other databases may also be designated.

The use of the command area 50 with "Internet" next to it is now described in more detail.

FIG. 17 illustrates a command element address book 520 which is stored on the computer 150. The command element address book 520 includes a number of different network command elements 522 and a number of different network addresses 524. Each network address 524 corresponds to a respective one of the network command elements 522. The network command elements 522 are freehand elements which may be preinstalled on the computer 150 or may be entered by a user when installing the program 170, perhaps by using the desk unit 24 or perhaps using block letters entered by the alpha-numeric input device 210.

A user may create a command element within the command area 50 with "Internet" next to it. The graphics tablet 78 provides the coordinates of the command element to the computer 150. In addition, the graphics tablet 78 provides information to the computer 150 of what the command element looks like. The command function logic 180 then compares the information of what the command element looks like with each one of the network command elements 522. The network command element 522 which corresponds most closely to the command element created within the area 50 with "Internet" next to it is then used to access a corresponding network address 524. For example, if a command element is created which looks more or less like an encircled "X" the third network address (Network address 3) is read from the command element address book 520.

Figure 18:
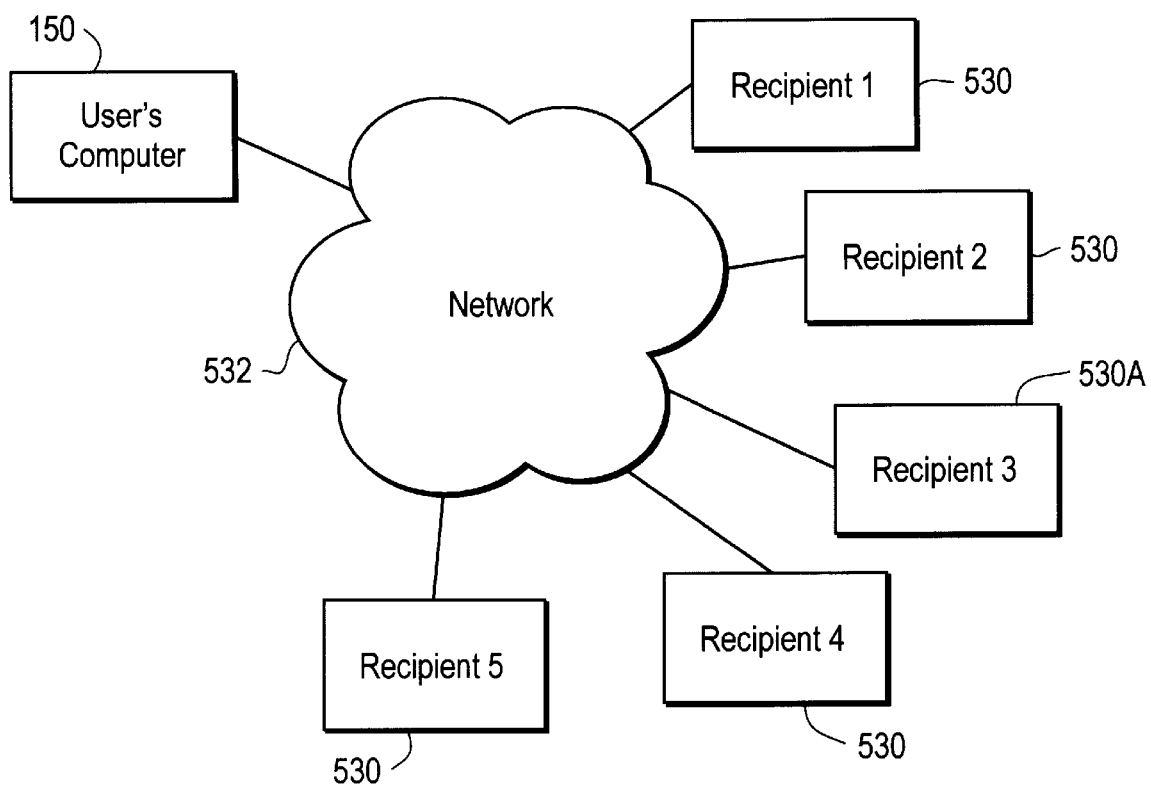
FIG. 18 illustrates the computer which is connected to a number of recipient computers over a network.

FIG. 18 illustrates a number of computers connected in a network configuration over a network 532 such as the Internet. The computers include the computer 150 of the user, and a number of recipient computers 530. Each recipient computer 530 has a different respective network address. The computer 150 of the user sends a packet of code and information to one of the recipient computers 530. The recipient computer 530 to which the packet sent is the one with the network address which is read from the command element address book 530. For example, should the third recipient computer 530A (Recipient 3) have the third network address (Network address 3), then the packet will be sent to the third recipient computer 530A.

Figure 19:
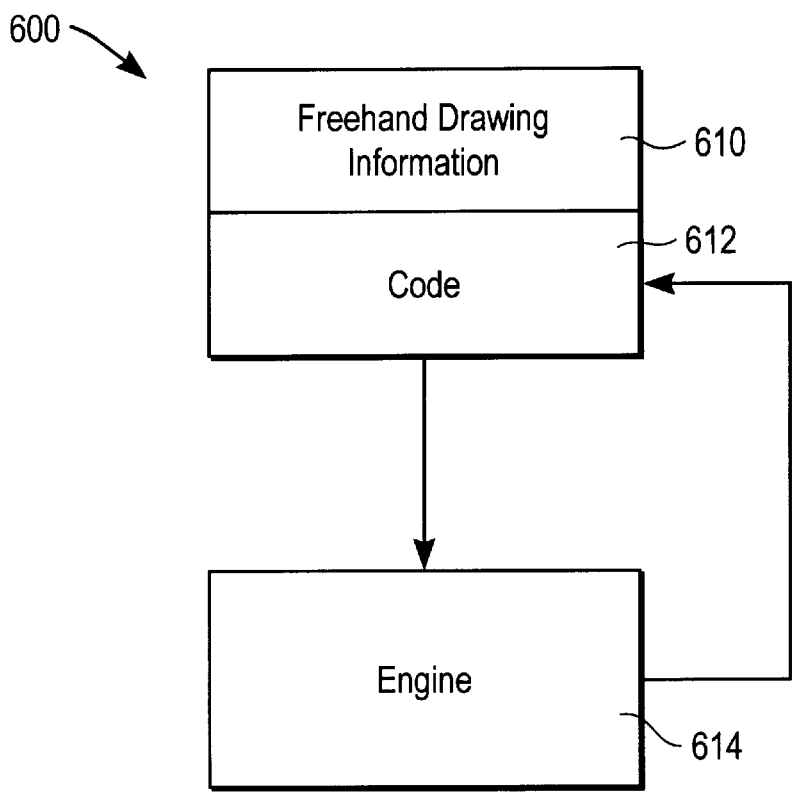
FIG. 19 illustrates a packet of code and information which is sent over the network to one of the recipient computers, the recipient computer depending on the network address in the command element address book of FIG. 17, and on the command element entered by the user in a selected one of the command areas 50 of the notesheet.

FIG. 19 illustrates a packet 600 which is sent to the recipient computer 530. The packet 600 includes information 610 of the note created on the notesheet. More specifically, the information includes all the information of the element 330 as represented by the table in FIG. 14c.

Figure 20:
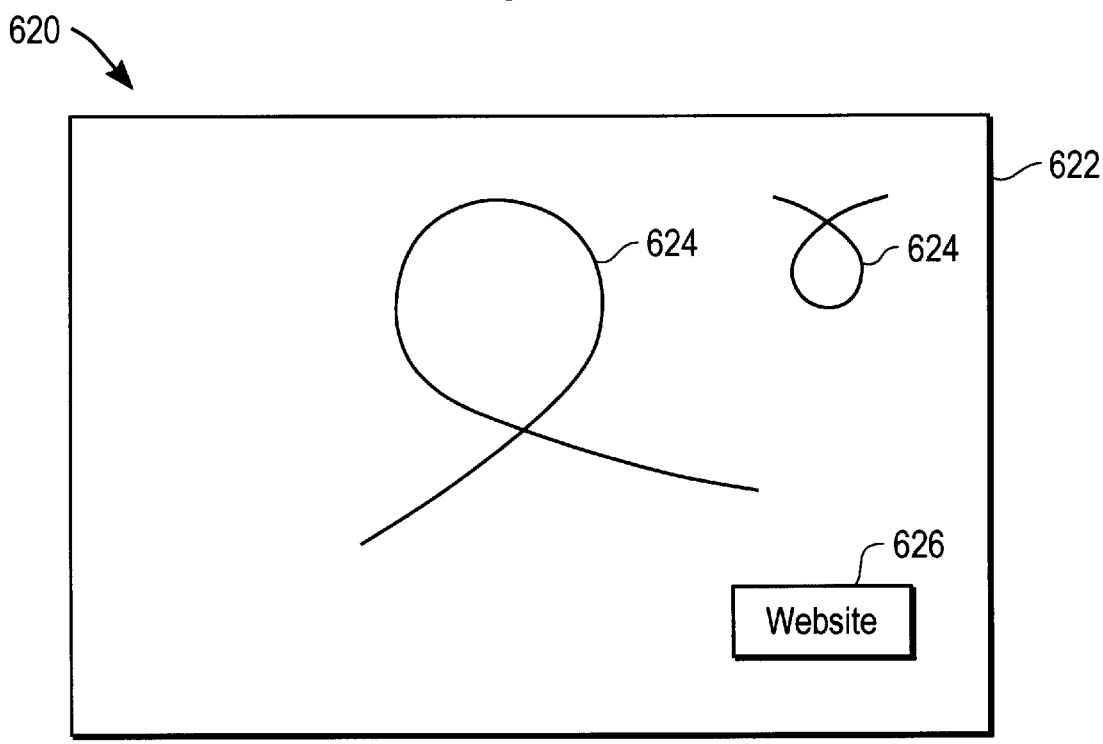
FIG. 20 illustrates a graphic display created by code of the packet and an engine on a recipient computer, the graphic display having elements which look like the elements of the note in freehand created on the notesheet.

An engine 614 is located on the recipient computer 530. The code 612, when received on the recipient computer 530A, automatically interacts with the engine 614 to control the recipient computer 530A. FIG. 20 illustrates a video display unit 620 of the recipient computer 530A. The code 612 and the engine 614 creates a note 622 displayed on the video display unit 620 by again drawing borders and filling the borders with color. The information 610 is used to create a number of elements 624 in the note 622. The elements look the same as the note in freehand created on the notesheet 33. (See FIG. 15a).

In addition, software on the recipient computer 530A may analyze the information, including the information in the table in FIG. 14c. The note created in freehand on the notesheet 32 may, for example, be a signature. The information may be used to authenticate the signature against proof data on the recipient computer 530A. The coordinates may, for example, be authenticated against the data on the proof of the data. In addition, since each point of the note corresponds with a certain moment in time, the speed and acceleration of the writing tip 302 can be determined at each moment in time and be compared with the proof data. An amount of pressure applied at each point is also included in the information and can be prepared with the proof data.

A button 626 is also created on the notesheet 622. When the recipient clicks on the button 626, the recipient computer opens a web browser. The web browser may then automatically open an Internet website with information of a kit such as the kit 20 hereinbefore described, sales information thereof, and more code that can be used to enhance the note 622. A sending user may also select a "signature" while creating the note in free hand on the notesheet 32. Such "signature" may determine other features of the note 622, such as a border, color or inclusions such as sounds of the note 622. The user may, for example, select such a "signature" by creating a character in another command area such as one of the command areas 50.

It can thus be seen that the hardware including the desk unit 24 and the stack of notesheets 26 need not necessarily be complicated or expensive. In particular, there may be no need for providing a processor within the desk unit 24.

The use of the hardware is also relatively uncomplicated. The only functions performed by a user is to locate one of the notesheets 26 on the graphics tablet 78, creating a note in freehand on the notesheet, and, maybe, creating a command element within one of the command areas 50. Simple handwriting data can be entered into a computer without a user having to look at a screen while concentrating on another task such as speaking with someone, or without having to wait for a specific computer program to be activated.

Regardless thereof that the hardware and the use thereof are relatively uncomplicated, relatively complex functions can be performed by the software on the computer 150. These functions include sending a note over the Internet and controlling a recipient computer.

One use of a kit as herein before described is for electronically recording handwritten notes. Such a kit may also find application in other fields such as commerce. A kit may for example include standard forms by bank tellers, receptionists, medical doctors for prescriptions, or credit card verifiers. A desk unit may be included with areas indicated for positioning of the forms. The software may include a list of templates from which a user may select a template corresponding to the forms used. The template will then be used to display notes on a computer. The template may also be modified or customized or the user may be able to create templates which correspond to forms which are designed and printed to requirement. A computer form can so be created which can be printed to provide a plurality of notesheets and which can form the basis of mapping command areas, recognized by the computer, to an actual notesheet that is used.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. A kit for recording a note in freehand, comprising:
a unit for relaying information of a note in freehand created on a notesheet, including a pad having a surface on which the notesheet can be positioned, the pad including a housing, and, secured to the housing, a position sensor detecting the position of a writing tip of a writing instrument when the notesheet is located on the surface and the writing instrument is used to create a note in freehand and a written command element on the notesheet, and providing information of the note in freehand and the written command element, a signal converter which receives the information of the note in freehand and the written command element from the position sensor and converts the information to a signal of information of the note in freehand, and the written command element, and a transmitter which receives the signal from the signal converter and transmits the signal to a remote location; and a computer readable medium having stored thereon a program which, when executed by a processor of a user computer at the remote location is capable of:
  (i) communicating with a receiver which receives the signal which is transmitted;
  (ii) recognizing the written command element in the signal;
  (iii) comparing the written command element from the signal with a number of different network command elements in a table of network command elements with each network command element having a different network address associated therewith, and accessing a selected network address in the table associated with a selected network command element in the table that corresponds most closely with the written command element; and
  (iv) transmitting a packet from the user computer to a recipient computer, the recipient computer having the selected network address, and the packet including information of the note created in freehand on the notesheet to enable the recipient computer to display a curve substantially corresponding to what the note in freehand created on the notesheet looks like in freehand.

2. A kit according to claim 1 further comprising:
a plurality of notesheets.

3. A kit according to claim 2 further comprising:
a container, the unit, computer readable medium and plurality of notesheets being held by the container.

4. A kit according to claim 2 wherein the notesheets each include a writing sheet and ink printed on the writing sheet, the ink leaving space for writing the note in freehand, defining a command area to write the written command element and indicating next to the area to write the written command element that the written command element relates to a network address, the program recognizing that the written command element is written in the command area to write the written command element.

5. A kit according to claim 2 wherein a form displayed by the program on a screen of the user computer is customizable to change the location of the command area to allow for a different notesheet having a command area at a different location to be used.

6. A kit according to claim 1 wherein at least some of the notesheets each include a writing sheet and ink printed on the writing sheet, the ink being laid out so that a plurality of command areas are defined thereby.

7. A kit according to claim 6 wherein the ink is laid out to define a command function at each command area, each command function indicating a different function to be performed by a computer at the remote location.

8. A kit according to claim 7 wherein at least one command function indicates that the computer should perform the function selected from the group consisting of:
  (i) storing an electronic representation of the note in freehand in an electronic address book;
  (ii) storing an electronic representation of the note in freehand in an electronic calendar; and
  (iii) storing an electronic representation of the note in freehand in an electronic "To-Do" database.

9. A kit according to claim 1 wherein the pad defines a selected area where the notesheet should be located and each sheet has dimensions substantially corresponding to dimensions of the selected area.

10. A kit according to claim 1 wherein the housing defines a receptacle having internal dimensions which allow for holding a stack of the notesheets, the housing defining an opening through which notesheets can be removed from the stack.

11. A kit according to claim 1 wherein the position sensor is a graphics tablet, an upper surface of the graphics tablet defining at least part of the surface of the pad.

12. A kit according to claim 1 wherein the signal is transmitted while the note in freehand is being created.

13. A kit according to claim 1 wherein the information includes information selected from the group consisting of:
  (i) an amount of pressure applied at each point of the note in freehand; and
  (ii) time of creation of each point of the note in freehand.

14. A kit according to claim 1 wherein the program determines a characteristic of an element of the note in freehand and, depending on the characteristic, controls the computer by performing at least one function selected from the group consisting of:
  (i) storing an electronic representation of the note in freehand in an electronic address book;
  (ii) storing an electronic representation of the note in freehand in an electronic calendar;
  (iii) storing an electronics representation of the note in freehand in an electronic "To-Do" database; and
  (iv) displaying a curve of the note in freehand on a display of the user computer.

15. A kit according to claim 1 wherein the packet includes information selected from the group consisting of:
  (i) a time varying position of the writing instrument;
  (ii) a time varying amount of speed of creation of the note in freehand; and
  (iii) a time varying amount of pressure when creating the note in freehand.

* * * * *